United States Patent [19]

Harrison et al.

[11] Patent Number: 5,532,295

[45] Date of Patent: Jul. 2, 1996

[54] THERMOPLASTIC SYNTACTIC FOAMS AND THEIR PREPARATION

[75] Inventors: Edward S. Harrison, Encinitas; Edward J. Ruskowski, Carlsbad; James Melquist, San Diego, all of Calif.

[73] Assignee: McDonnell Douglas Technologies Inc., San Diego, Calif.

[21] Appl. No.: 146,517

[22] Filed: Nov. 1, 1993

[51] Int. Cl.$^6$ ........................................... C08J 9/32
[52] U.S. Cl. .................. 523/218; 428/304.4; 428/313.3; 428/313.9; 428/314.2; 428/314.4; 428/315.5; 428/473.5; 521/54; 521/55; 521/134; 521/135; 521/138; 523/219
[58] Field of Search ................... 521/54, 55, 134, 521/135, 138; 523/218, 219; 428/304.4, 313.3, 313.9, 314.2, 314.4, 315.5, 473.5

[56] References Cited

U.S. PATENT DOCUMENTS

| | | | |
|---|---|---|---|
| 4,595,623 | 6/1986 | Du Pont et al. | 523/218 |
| 4,865,784 | 9/1989 | Hill | 523/218 |
| 5,032,627 | 7/1991 | Wilson et al. | 523/218 |
| 5,120,769 | 6/1992 | Dyksterhouse et al. | 523/218 |
| 5,356,958 | 10/1994 | Matthews | 523/218 |

*Primary Examiner*—James J. Seidleck
*Assistant Examiner*—John M. Cooney, Jr.
*Attorney, Agent, or Firm*—Gregory Garmong

[57] ABSTRACT

A low-density, porous material is prepared by mixing together microballoons and an oligomeric precursor to a polyetherimide polymer. The oligomeric precursor has an initial viscosity sufficiently low that it can flow and wet the microballoons when first heated to a polymerization processing temperature, and thereafter polymerize. Fibers may be controllably incorporated into the material during processing to impart specific properties, and air may be controllably incorporated into the material during processing to further decrease its density.

9 Claims, 2 Drawing Sheets

THERMOPLASTIC SYNTACTIC FOAMS AND THEIR PREPARATION

BACKGROUND OF THE INVENTION

This invention relates to structural materials having low densities, and, more particularly, to a nonmetallic, low-density, syntactic foam material.

Low-density nonmetallic materials with good mechanical properties are required for a number of aerospace and other applications. In one example, radomes that house radar antennas must have sufficient strength to withstand aerodynamic forces. The material used to construct the radome cannot interfere with the signals transmitted therethrough. In another example, stiffened sandwich core structures are formed by placing a core of material between spaced-apart face sheets. The core is present largely to space the face sheets apart so that the structure has a high flexural rigidity. In such applications, extremely high strengths at ambient and elevated temperatures are not a requirement, but moderate strength is desirable.

In some of these applications, the materials of construction are preferably of as low a density as possible while achieving the required mechanical properties. The low density leads to reduced fuel consumption in aircraft uses. A low density and weight may also be desirable in specialized non-aircraft applications such as rotating machinery.

Structural metals of relatively low density such as aluminum have been widely used for many years. More recently, structural nonmetallic materials such as epoxies and graphite/epoxy composite materials have been developed and have entered service. Foamed polymeric materials have also found many uses. The latter class of materials have densities even less than the polymeric materials from which they are constituted, since a portion of the interior of the material is voids that are intentionally produced in the material.

The existing polymeric materials and foamed polymeric materials have some drawbacks, however. Most significantly, the foamed polymeric materials are somewhat less controlled than is desired. They also do not have sufficiently high mechanical properties for some applications such as radomes.

There is therefore a need for an improved nonmetallic, low-density material of good mechanical properties. The present invention fulfills this need, and further provides related advantages.

SUMMARY OF THE INVENTION

The present invention provides a low-density, thermoplastic syntactic foam material. The material can be prepared in a semifinished form and finished into articles, or the material can be formed to its final shape. The density of the basic material is low and the mechanical properties are good. The properties can be manipulated by selectively and controllably retaining air within interstices of the material during manufacture. Increased air in the material reduces its density and its mechanical properties as well. By controlling the relative amounts of the phases in the material, there is great flexibility to tailor the balance of density and mechanical properties for specific applications.

In accordance with the invention, a structural, low-density article comprises a microballoon first component, and a polyetherimide polymer second component wetted to the microballoons and binding the microballoons together in an array. The microballoons are generally spherical, thin-walled hollow spheres of silica or other material. The polyetherimide polymer is preferably produced by polymerizing an oligomeric precursor. The wetting of the polyetherimide polymer to the microspheres imparts good strength to the material, and the controlled porosity provided by the microspheres results in low material density.

The first component may be present in an amount of from about 3 parts by volume to about 85 parts by volume of the article and the second component may be present in an amount of from about 97 parts by volume to about 15 parts by volume of the article. In a most preferred composition, the first component comprises from about 82 parts by volume to about 78 parts by volume of the article and the second component comprises from about 18 parts by volume to about 22 parts by volume of the article.

There may also be short fibers such as chopped fibers present in the material, preferably in an amount of from about 0.1 parts by volume to about 20 parts by volume of the material. The fibers reduce the bulk density of the mixed components, allowing fabrication of lower density articles. The material may also contain air in interstices in an amount of from about 3 parts by volume to about 30 parts by volume of the article. The air controllably reduces the density of the material, at the sacrifice of strength.

The invention also encompasses a method for preparation of the low-density material. In accordance with this aspect, a method for preparing a structural, low-density article comprises the steps of furnishing a microballoon first component and furnishing a second component of a lower molecular weight oligomeric precursor to a higher molecular weight polyetherimide polymer. The oligomeric precursor has an initial viscosity at a processing temperature of about 320°–340° C. sufficient to flow and to wet the microballoons prior to polymerization. The first component and the second component are mixed together and heated to the processing temperature for a time sufficient for the oligomeric precursor to flow and to wet the microballoons, and thereafter to polymerize. Fibers and air may also be added to the mixture prior to heating.

In one approach, the dry mixture is placed into a mold prior to heating. The mold has a controllable final volume, and the volume is controlled during heating to attain a final preselected volume. For a fixed amount of mixture of microspheres and oligomeric precursor, the density of the material can be controlled by changing the final volume of the mold. The smaller the final volume of the mold for a fixed amount of mixture, the higher the density and the higher the strength of the final material.

The present invention provides a nonmetallic, low-density material whose properties can be tailored for a wide variety of required combinations of properties. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
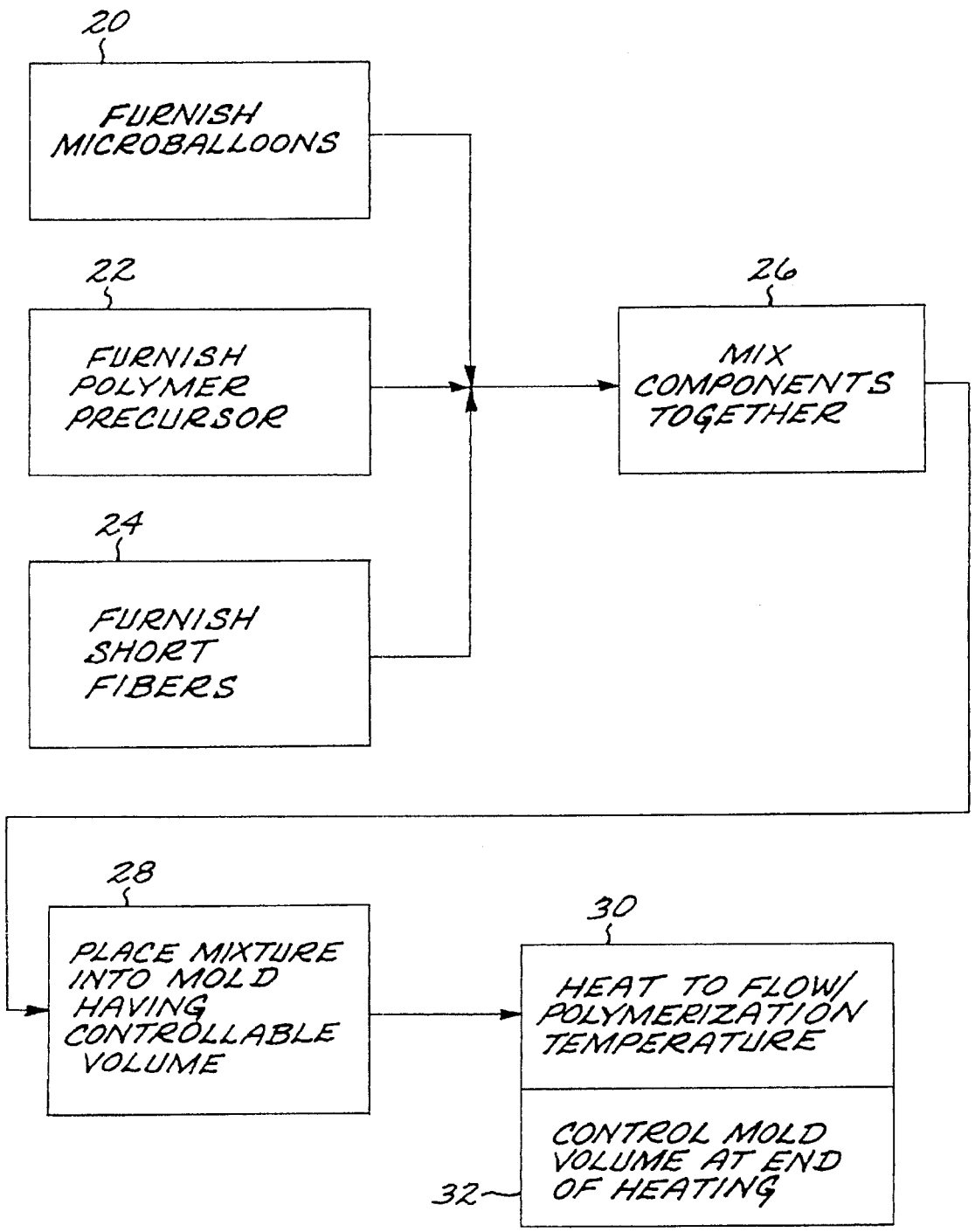
FIG. 1 is a process flow chart for the preparation of the material of the invention.

FIG. 1 is a process flow diagram for preparing a low-density foam material. Microballoons are furnished, numeral 20. The microballoons are commercially available small, generally spherical, hollow bodies. They are available in a range of diameters of several hundred micrometers and less, with wall thicknesses of about 1½ micrometers. They are made from any operable material, but are typically primarily silica ($SiO_2$). Suitable coupling agent may be applied to the microballoon surface to enhance its properties. Preferred microballoons are sold under the trademark Eccospheres SI microballoons, and are available from W. R. Grace & Co., Canton, Mass. The microballoons are preferably present in an amount of from about 3 to about 85 parts by volume, most preferably in an amount of from about 78 to 82 parts by volume, of the material.

Figure 2:
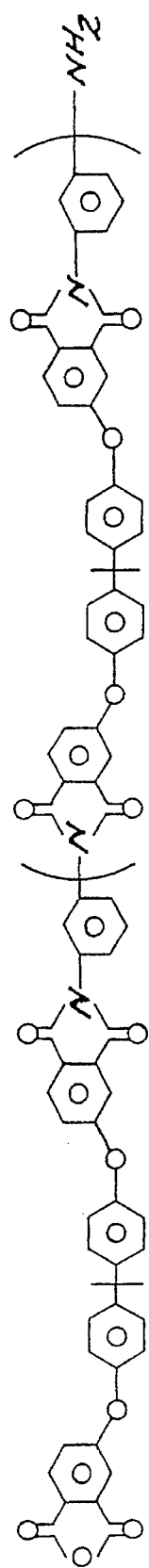
FIG. 2 is an idealized chemical structure for the oligomeric precursor material.

A lower molecular weight, partially polymerized oligomeric precursor to a polyetherimide polymer is furnished, numeral 22. The prepolymer, terminated with reactive end groups, preferably has a structure as shown in FIG. 2. (Variants of the structure of FIG. 2 with di-amino end cap and di-anhydride end cap species are also operable.) This oligomeric precursor is sold under the trademark Ultem 1010P, and is available from General Electric Co. The polyetherimide polymer resulting from the polymerization of the prepolymer shown in FIG. 2 is known as Ultem 1000, also a trademark of General Electric. This component is chosen because of its low initial viscosity in a preferred processing temperature of about 320°–340° C. The prepolymer is a solid at ambient temperature and has a glass transition of about 210° C. It is ground to a particulate form, preferably of −100 mesh size (<40 micrometers) for subsequent mixing. The relatively low initial viscosity permits the molten prepolymer to flow over the microballoons upon heating to a processing temperature well above the glass transition temperature. After flowing and covering the microballoons, the prepolymer polymerizes to a polyetherimide polymer. The oligomeric precursor is present in an amount of from about 85 to about 3 parts by volume, most preferably from about 22 to about 18 parts by volume, of the mixture.

Short fibers, such as electrically inactive chopped fibers, may optionally be furnished, numeral 24. The fibers are usually employed to reduce the bulk density of the mixed material to allow fabrication of lower density systems. The addition of the fibers produces a network structure which supports the other components, resulting in lower bulk density. The fibers are typically of a diameter of no more than about 11 micrometers and a length of no more than 8000 micrometers. The fibers, when used, are typically present in an amount of from about 0.1 to about 20 parts by volume.

The microballoons, solid oligomeric precursor powder, and fibers (when used) are mixed together, numeral 26. A carrier fluid such as water or an organic liquid (that is not a solvent for the precursor or the polymer) serves as a vehicle for obtaining a uniform distribution of microballoons, solid precursor particles, and fibers, if any. The solid components are dispersed in the carrier fluid, which is thereafter removed so that the uniform mixture is ready for further processing. Upon mixing, the mixture typically has a consistency like that of wet sand.

Figure 3:
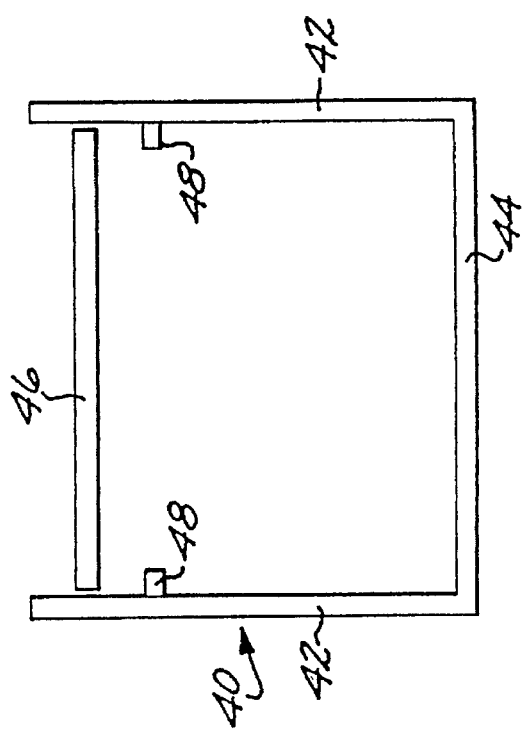
FIG. 3 is a schematic view of a mold used to prepare the material.

The mixture is placed into a mold having a controllable final volume, numeral 28. An example of such a mold 40 is shown in FIG. 3. The mold 40 has fixed side walls 42 and a fixed bottom 44. A top 45 is movable and can slide downwardly between the side walls 42. Stops 48 project inwardly from the side walls 42 and are of a sufficient length to halt the downward movement of the top 46. A sufficient amount of the mixture of components is provided to initially fill the mold above the stops 48.

The mold and contained mixture are heated to the processing temperature, preferably from about 320° C. to about 340° C., by placing them into a furnace operating at that temperature, numeral 30. As the oligomeric precursor is heated above its glass transition temperature of about 210° C., it softens and flows around the microballoons to wet and encapsulate them. The wetting of the microballoons is important to the final mechanical properties of the material. An absence of wetting leads to a weak product.

The mass can be compressed due to the flowing of the oligomeric precursor. The weight of the top 46 (and added force, if necessary) compresses the mass of oligomeric precursor and microballoons. Simultaneously with the heating, the final interior volume of the mold is determined, numeral 32. The top 46 gradually moves downwardly, until its movement is halted by the stops 48.

Because the microballoons are largely incompressible under the heating conditions, the downward movement of the top 46 compresses the oligomeric precursor into any voids found within the structure. Air, which may be viewed as a component of the final product, is displaced and driven out of the mass. The amount of air that is displaced is governed by the extent of compression of the mass, which in turn is governed by the extent of movement of the top 46. The more air that is displaced, the higher the density and the higher the strength of the final material. In the final product, the amount of air is preferably from about 3 to about 30 parts by volume.

Continued heating at the processing temperature causes the oligomeric precursor to chain extend and imidize, forming a high molecular weight polyetherimide polymer. The total time required at the processing temperature to complete the reaction is from about 30 to about 90 minutes, preferably about 60 minutes.

Figure 4:
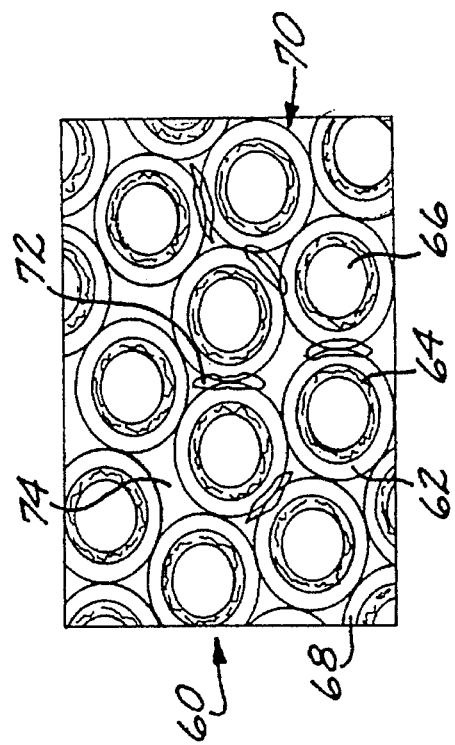
FIG. 4 is a schematic drawing of the microstructure of the material of the invention.

FIG. 4 is a drawing representative of the microstructure of the material 60 produced by the above-described processing. Microballoons 62 include a largely silica shell or wall 64 enclosing a void 66. The exterior of the wall 64 of the microballoons 62 is covered with a layer 68 of polyetherimide polymer that wets the microballoons. The adjacent layers 68 bond together, bonding the microballoons into an irregular array 70. Optionally present fibers 72 are shown within the array 70, and are also bonded into the array by the polyetherimide polymer. Within the array 70 there are air-filled interstices 74. The relative amount of the interstices and parts of the air component are determined by the extent of compression of the mass while in the mold 40 during the fabrication procedure. The material 60 is a syntactic material by virtue of the presence of the hollow microballoons and the controlled interstitial porosity. The polymeric material itself is not foamed.

A series of specimens of the material of the invention have been prepared according to the procedure discussed above. The relative amounts of components have been varied, and the properties of the final product have been measured. Table I summarizes the constituents of each specimen and its density:

TABLE I

| No. | Constituent, parts by vol. | | | Density (lb/ft³) |
| --- | --- | --- | --- | --- |
| | Microballoons | Polyetherimide | Air | |
| 1 | 48.5 | 10.6 | 40.8 | 16.0 |
| 2 | 50.1 | 14.1 | 35.8 | 19.0 |
| 3 | 61.8 | 37.8 | <1 | 40.0 |

Table II summarizes the mechanical properties of these specimens. All strengths are in pounds per square inch (psi).

TABLE II

| No. | Compression, psi | | Tension, psi | | Core Shear Strength, psi |
| --- | --- | --- | --- | --- | --- |
| | Strength | Modulus | Strength | Modulus | |
| 1 | 700 | — | 600 | 24,000 | 400 |
| 2 | 1000 | 57,000 | 750 | 25,000 | 550 |
| 3 | 10000 | 207,000 | — | — | — |

These results demonstrate that the properties of the final product can be significantly varied by controlling the ratios of the constituents.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for preparing a structural, low-density article, comprising the steps of:
   furnishing a microballoon first component;
   furnishing a second component of a lower molecular weight oligomeric precursor which is polymerizable to a higher molecular weight polyetherimide polymer, the oligomeric precursor having an initial viscosity at a processing temperature of about 330° C. sufficient to flow and to wet the microballoons prior to polymerization;
   mixing the first component and the second component together; and
   heating the mixture to the processing temperature of about 330° C. for a time sufficient for the oligomeric precursor to flow and to wet the microballoons, and thereafter to polymerize.

2. The method of claim 1, including the additional step, prior to the step of mixing, of
   furnishing a third component of fibers, and wherein the step of mixing includes the step of
   mixing the first component, the second component, and the third component together with a liquid carrier to facilitate dispersion and uniformity of the mixture.

3. The method of claim 1, including the additional step, prior to the step of heating, of
   placing the mixture into a mold.

4. The method of claim 3, including the additional step, concurrently with the step of heating, of
   controllably establishing the final volume of the mold.

5. The method of claim 1, wherein the oligomeric precursor has the structure

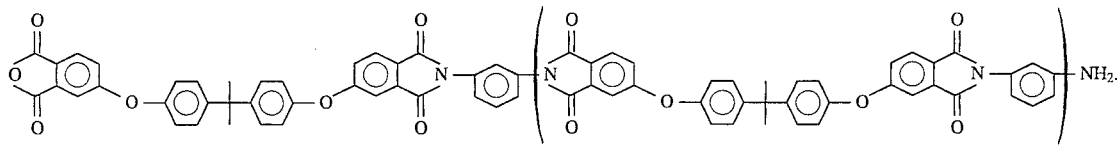

6. A method for preparing a structural, low-density article, comprising the steps of:
   furnishing from about 82 to about 78 parts by volume of microballoons;
   furnishing from about 18 to about 22 parts by volume of a finely divided oligomeric precursor;
   mixing the microballoons and the oligomeric precursor together;
   placing the mixture into a mold; and
   heating the mixture to a temperature of from about 320° C. to about 340° C. for a time of from about 30 minutes to about 90 minutes.

7. The method of claim 6, including the additional step, performed concurrently with the step of heating, of
   establishing the internal volume of the mold to a preselected value at the conclusion of the step of heating.

8. The method of claim 6, wherein the oligomeric precursor has the structure depicted in FIG. 2.

9. The method of claim 6, including the additional step, prior to the step of placing, of
   furnishing a fiber third component, and the step of mixing includes the step of mixing the microballoons, the oligomeric precursor, and the fibers together.

* * * * *